United States Patent
Roques (10) Patent No.: US 9,828,110 B2
(45) Date of Patent: Nov. 28, 2017

(54) SYSTEM FOR RECOVERING AND CONVERTING KINETIC ENERGY AND POTENTIAL ENERGY AS ELECTRICAL ENERGY FOR AN AIRCRAFT

(71) Applicant: LABINAL POWER SYSTEMS, Blagnac (FR)

(72) Inventor: Serge Roques, Cornebarrieu (FR)

(73) Assignee: Labinal Power Systems, Blagnac (FR)

( * ) Notice: Subject to any disclaimer, the term of this patent is extended or adjusted under 35 U.S.C. 154(b) by 67 days.

(21) Appl. No.: 14/781,894

(22) PCT Filed: Apr. 1, 2014

(86) PCT No.: PCT/FR2014/050775
§ 371 (c)(1),
(2) Date: Oct. 1, 2015

(87) PCT Pub. No.: WO2014/162092
PCT Pub. Date: Oct. 9, 2014

(65) Prior Publication Data
US 2016/0031567 A1 Feb. 4, 2016

(30) Foreign Application Priority Data

Apr. 2, 2013 (FR) .................... 13 52953

(51) Int. Cl.
*B64D 41/00* (2006.01)
*F03D 1/04* (2006.01)
(Continued)

(52) U.S. Cl.
CPC .......... *B64D 41/007* (2013.01); *B64D 41/00* (2013.01); *F03D 1/04* (2013.01); *F03D 1/06* (2013.01);
(Continued)

(58) Field of Classification Search
CPC .......... B64C 7/00; B64D 29/00; B64D 29/02; B64D 33/00; B64D 41/00; B64D 41/007; B64D 2041/002; B64D 47/00
See application file for complete search history.

(56) References Cited

U.S. PATENT DOCUMENTS 3,066,889 A * 12/1962 Kelly ...................... B64C 15/02
244/12.3
3,130,942 A * 4/1964 Fradenburg ............... B64C 7/00
244/17.11
(Continued)

FOREIGN PATENT DOCUMENTS

DE 10 2009 006242 A1 7/2010
EP 0 346 711 A2 12/1989
(Continued)

OTHER PUBLICATIONS

English Translation of Search Report dated Jul. 25, 2014, in corresponding International PCT Application No. PCT/FR2014/050775, filed on Apr. 1, 2014 (3 pages).

*Primary Examiner* — Tien Dinh
*Assistant Examiner* — Michael A Fabula
(74) *Attorney, Agent, or Firm* — Bookoff McAndrews, PLLC (57) ABSTRACT

An electrical energy generator system for an aircraft, the system including a streamlined fairing containing at least one turbine housed in the front portion of the fairing, and an electrical energy generator connected to said turbine. The front portion of the fairing is fitted with air admission means that are movable between an open position in which the turbine is exposed to the stream of air outside the fairing and a closed position in which the turbine is masked inside the fairing. The system may serve to reduce the aerodynamic drag caused by turbulence present at a wing tip for a conventional wing having sharp edges during stages of (Continued)

takeoff, climbing, and cruising; and during stages of descent it makes it possible to recover the kinetic and potential energy that has been accumulated by the aircraft during its stages of climbing and cruising.

16 Claims, 5 Drawing Sheets

(51) Int. Cl.
    *F03D 1/06*     (2006.01)
    *F03D 9/10*     (2016.01)
    *F03D 9/25*     (2016.01)

(52) U.S. Cl.
    CPC ............... *F03D 9/10* (2016.05); *F03D 9/25* (2016.05); *B64D 2041/002* (2013.01); *F05B 2220/31* (2013.01); *Y02E 10/721* (2013.01); *Y02T 50/53* (2013.01)

(56) References Cited

U.S. PATENT DOCUMENTS

| | | | | |
|---|---|---|---|---|
| 4,477,040 A * | 10/1984 | Karanik | ................ | B64C 21/04 244/58 |
| 4,489,904 A * | 12/1984 | Soederberg | ............ | B64D 33/02 244/235 |
| 4,917,332 A * | 4/1990 | Patterson, Jr. | ........ | B64C 23/065 244/199.3 |
| 5,150,859 A * | 9/1992 | Ransick | ................ | B64C 23/065 244/199.3 |
| 5,297,764 A * | 3/1994 | Haney | ................... | B64C 23/065 244/199.3 |
| 5,505,587 A * | 4/1996 | Ghetzler | ............. | B64D 41/007 415/144 |
| 5,934,612 A * | 8/1999 | Gerhardt | ................ | B64C 23/065 244/199.3 |
| 6,270,309 B1 * | 8/2001 | Ghetzler | .............. | B64D 41/007 137/15.1 |
| 7,270,214 B1 * | 9/2007 | Tonnessen | ........... | G01V 1/3826 114/244 |
| 8,653,688 B2 * | 2/2014 | Justak | .................. | B64D 41/007 290/44 |
| 8,678,310 B2 * | 3/2014 | Masoudipour | ....... | B64D 41/007 244/53 B |
| 8,814,081 B2 * | 8/2014 | Gagne | .................... | B64D 27/00 244/118.2 |
| 9,371,739 B2 * | 6/2016 | Robinson | ................ | F01D 17/02 |
| 2009/0026770 A1 | 1/2009 | Huntemann | | |
| 2010/0044519 A1 * | 2/2010 | Fol | .......... | B64C 23/00 244/198 |
| 2010/0170981 A1 | 7/2010 | Belleville | | |
| 2011/0033280 A1 * | 2/2011 | Justak | ................... | B64D 41/007 415/73 |
| 2012/0006938 A1 | 1/2012 | Gatzke | | |
| 2012/0160957 A1 * | 6/2012 | Gagne | .................... | B64D 27/00 244/54 |
| 2012/0299558 A1 * | 11/2012 | Justak | .................. | B64D 41/007 322/28 |
| 2012/0301273 A1 * | 11/2012 | Justak | .................. | B64D 41/007 415/4.3 |
| 2013/0048780 A1 * | 2/2013 | Masoudipour | ............ | F02C 7/32 244/58 |
| 2014/0193236 A1 * | 7/2014 | Robinson | ............. | B64D 41/007 415/1 |
| 2016/0176533 A1 * | 6/2016 | Cazals | ...................... | B64C 3/32 244/54 |

FOREIGN PATENT DOCUMENTS

| | | |
|---|---|---|
| GB | 2 461 057 A | 12/2009 |
| WO | WO 00/38985 A2 | 7/2000 |

\* cited by examiner

SYSTEM FOR RECOVERING AND CONVERTING KINETIC ENERGY AND POTENTIAL ENERGY AS ELECTRICAL ENERGY FOR AN AIRCRAFT

CROSS-REFERENCE TO RELATED APPLICATION(S)

This application is the U.S. national phase entry under 35 U.S.C. §371 of International PCT Application No. PCT/FR2014/050775, filed on Apr. 1, 2014, which claims priority to French Patent Application No. FR 1352953, filed on Apr. 2, 2013, the entireties of each of which are incorporated by reference herein.

BACKGROUND OF THE INVENTION

The present invention relates to generating electrical energy in aircraft by recovering kinetic energy and potential energy.

When an airplane gains on altitude and speed, it increases its kinetic energy Ec and its potential energy Ep, which can be calculated respectively from the following formulas:

$$Ec = \tfrac{1}{2}mv^2$$

$$Ep = mgh$$

where m is the mass of the airplane, v is the speed of the airplane, g is acceleration due to gravity (9.81 m/s$^2$) and h is the height of the airplane relative to the ground.

During a stage of climbing, the airplane increases its speed so as to go from a takeoff speed of about 230 kilometers per hour (km/h) to a cruising speed lying in the range approximately 500 km/h to 800 km/h (Mach 0.82 to 0.84), thereby enabling it to accumulate a very large amount of kinetic energy. Concerning potential energy, present airplanes cruise at an altitude of about 12,000 meters (m).

During a stage of descent, because of the kinetic energy and the potential energy that has been accumulated, the pilot needs to control the speed of the airplane so as to avoid exceeding a critical speed or limiting Mach number referred to as the maximum operating limit speed or Mach number (VMO/MMO) beyond which the airplane can suffer major damage.

Nevertheless, and paradoxically, during stages of descent, the pilot is often obliged to increase engine speed in order to have sufficient energy for pressurizing and conditioning cabin air and also for running electrical devices on board. Under such circumstances, the pilot increases engine speed in order to cover demands for electrical and pneumatic energy while deploying air brakes in order to avoid exceeding the maximum operating limit speed or Mach number (VMO/MMO). That solution is not satisfactory since it leads to excessive fuel consumption in the engines even though they are operating at low speed during this stage of flight (descent).

Consequently, there exists a need to have a source of energy in an aircraft that is suitable for supplying electrical energy, and of doing so independently of engine speed. This need is particularly important since proposals are presently being made to replace the hydraulic means used by most functions of an airplane (e.g. extending landing gear, braking, etc.) with means that are entirely electrical, in particular for the purpose of lightening the overall weight of the airplane.

It is also known to fit the wing tips of airplanes with shells that are substantially in the shape of wing tip tanks in order to reduce the negative effects of wing tip turbulence (vortices), which shells serve to limit drag, and consequently to limit wing tip energy losses.

OBJECT AND SUMMARY OF THE INVENTION

To this end, the invention provides an electrical energy generator system for an aircraft, the system comprising a shell having the shape of a wingtip tank and containing at least one turbine housed in the front portion of the shell and an electrical energy generator connected to said turbine, the front portion of the shell being fitted with air admission means that are movable between an open position in which the turbine is exposed to the outside stream of air, and a closed position in which the turbine is masked inside the shell, the air admission means comprising flaps or slats that are movably fastened between the nose and the body of the shell.

Thus, an aircraft having at least one such system has a source of energy that is suitable for supplying additional electrical energy independently of the energy being supplied by the engine. Respective systems of the invention may be mounted for example at the tips of an airplane's wings and/or at the ends of one or more portions of its tail unit.

When the air admission means of the system of the invention are in the closed position, the system of the invention is totally streamlined and does not give rise to any longitudinal drag during stages of takeoff, climbing, and cruising. During the stage of descent, the air admission means of the system are placed in the open position so as to enable outside air to drive the turbine and the associated generator to produce electricity by recovering the kinetic and potential energy of the aircraft. The air admission means may also be placed in the open position during stages of takeoff, climbing, and cruising, should that be necessary, e.g. in the event of a failure of one or more engines or of their generators.

With the electrical energy generator system of the invention, there is no longer any need to increase engine speed above its normal speed during the stage of descent, thus making it possible on each flight to save 1% to 3% of fuel consumption, depending on the level reached and the speed at the end of cruising.

According to a first characteristic of the system of the invention, the air admission means comprise flaps fastened in hinged manner to the nose of the shell, the flaps being lowered in the open position of the air admission means and being held in alignment with the body of the shell in the closed position of the air admission means.

According to a second characteristic of the system of the invention, the air admission means comprise slats or butterfly members pivotally fastened between the nose and the body of the shell, the slats extending perpendicularly relative to the surface of the shell in the open position of the air admission means and being held parallel with the surface of the shell in the closed position of the air admission means.

In both circumstances, the air admission elements are totally integrated in the shell of the system when they are in the closed position, thereby not increasing drag as a result of local turbulence.

According to a third characteristic of the system of the invention, it further comprises storage means for storing the electrical energy produced by the electrical energy generator. Thus, some or all of the electrical energy produced by the system of the invention can be stored and used subsequently on demand. The electrical energy storage means may be selected from at least one electrical energy storage means selected from at least one of the following means: battery; supercapacitor; and flywheel.

According to a fourth characteristic of the invention, the system includes openings in the rear portion of the shell enabling the air stream flowing inside the shell to be exhausted and cooling the power electronics associated with the electricity generator and also cooling the electrical energy storage means, in particular when they are constituted by batteries that may heat up while they are being charged.

According to a fifth characteristic of the invention, the turbine has variable pitch blades, thus making it possible to control the speed of rotation of the turbine as a function of the speed of the air stream striking the turbine, and thus making it possible to regulate the frequency of the electricity generator.

The invention also provides an aircraft including at least one system of the invention. The aircraft may in particular correspond to an airplane having a respective system of the invention at the end of each of its wings and/or at the ends of one or more portions of its tail unit.

In a first aspect of the aircraft of the invention, it includes a control device "C" for causing the air admission means to open automatically, at least during a stage of the aircraft descending. The aircraft may thus have an additional source of electrical energy available during stages of descent without needing to increase engine speed as is commonly done during such a stage.

In a second aspect of the aircraft of the invention, it includes a control device "C" for automatically causing the air admission means to open in the event of the failure of at least one engine of the aircraft, and/or of a generator of at least one engine of the aircraft.

In a third aspect of the aircraft of the invention, the electrical energy generator systems may also be controlled manually by means of a control button or switch "S" placed in the cockpit of the airplane. The pilot or the copilot can thus act manually to cause the air admission means to open, and can thus consequently cause electrical energy to be produced when so desired, in particular in the event of an emergency (total failure of one or more of the main engines or loss of electricity generation in one or more of the engines) or in an electric airplane emergency.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

Figure 1:
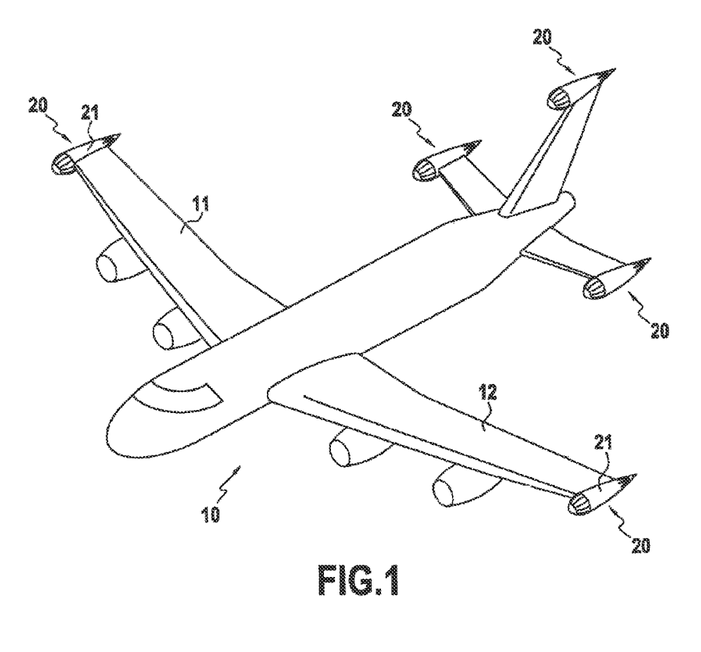
FIG. 1 is a diagrammatic perspective view of an airplane fitted with electrical energy generator systems in an embodiment of the invention.

FIG. 1 shows an airplane 10 that includes, in accordance with an embodiment of the invention, two electrical energy generator systems 20 placed respectively at the ends of wings 11 and 12. Each system 20 comprises a streamlined fairing 21 corresponding in this example to a shell having the shape of a wing tip tank and of the same type as those fitted to the ends of airplane or missile wings in order to reduce or "break" turbulence (vortices) at the wing tip and reduce the interfering aerodynamic drag due to such turbulence. The shape of the fairing is essentially that of a wing tip tank or an ovoid that is tapered to a greater or lesser extent depending on the size and the shape of the wing on which the system of the invention is to be mounted. Any other shape serving to reduce aerodynamic drag could be used. In addition, or instead of two electrical energy generator systems 20 placed at the ends of wings, the airplane could also have one or more systems 20 placed at the ends of portions of the airplane tail unit, as shown in FIG. 1.

Figure 2:
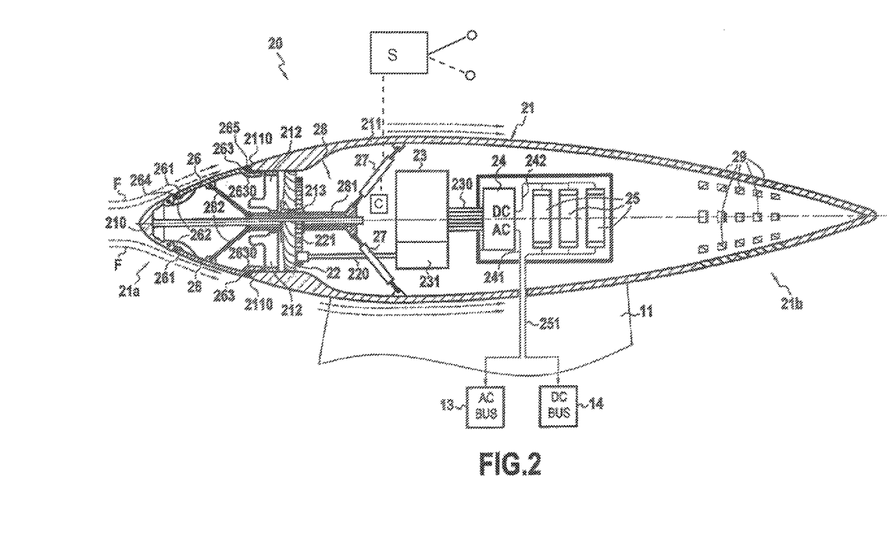
FIG. 2 is a diagrammatic section view of a FIG. 1 electrical energy generator system in the closed position in accordance with an embodiment of the invention.

As shown in FIG. 2, inside its fairing 21, each system 20 contains a turbine 22 having its shaft 220 connected to the rotor (not shown) of an electricity generator 23. The electricity generator 23 is a rotary machine, e.g. an alternator. In the presently-described example, the shaft 220 is connected to the electricity generator 23 via stepdown gearing 231.

Since the speed of the turbine can vary significantly depending on variations in the speed of the airplane, the system 20 also has a regulator 24 connected to the output 230 of the electricity generator. The regulator 24 serves to convert the alternating voltage at varying amplitude produced by the generator into an alternating voltage at constant amplitude and/or a direct current (DC) voltage. In the presently-described example, the regulator 24 performs both of these functions, and for this purpose it has a first output 241 delivering an alternating voltage at constant amplitude that is used for injecting directly into the primary electricity power supply network 13 of the airplane, and a second output 242 delivering DC and for use in recharging electrical energy storage elements 25, specifically batteries that may be constituted by nickel cadmium or lithium ion storage batteries. In variant embodiments, the electrical energy storage elements may also be formed by supercapacitors or by flywheels. The electrical energy stored in the element 25 is injected on demand via an output 251 into the secondary electrical power supply network 14 of the airplane.

The electrical energy immediately available from the output 241 of the regulator or the energy previously stored in the storage elements 25 and available at the output 251, can be used during stages of descent in order to power numerous devices of the airplane, such as in particular:
  pressurizing the cabin of the airplane;
  air conditioning the cabin;
  de-icing mats for heating the leading edges of the wings;
  an electrical system for extending landing gear;
  electrical braking.

Each electrical energy generator system 20 also has air admission means in the front portion 21a of the fairing 21, which air admission means are movable between an open position in which the turbine 22 is exposed to the stream of air outside the fairing (FIG. 3), and a closed position in which the turbine is masked inside the fairing (FIG. 2).

In the presently-described embodiment, the air admission means are constituted by flaps or lids 26 of curved shape that are arranged between the nose 210 and the body 211 of the fairing 21. The upstream end 261 of each flap 26 is fastened to the nose 210 via a hinge connection 262, while the downstream end 263 of each flap 26 is free. The downstream end 263 presents a portion 2630 of curved shape that presses against the upstream end 2110 of the body 211 when the flaps 26 are in the closed position, as shown in FIG. 2. In order to reduce potential drag due to turbulence created at the clearance present between the flaps and the fairing, an upstream annular sealing gasket 264 is arranged in the portion present between the nose 210 and the upstream end 261 of the flaps 26, and a downstream annular sealing gasket 265 is arranged between the upstream end 2110 of the body 211 and the downstream ends 263 of the flaps 26.

In the presently-described example, the flaps 26 are held and moved between a closed position and an open position by actuators 27, each secured at one end to the inside wall of the fairing 21 and at the other end to a flap 26 via a linkage 28. In the closing position of the air admission means as shown in FIG. 2, the actuators 27 exert thrust on the shaft 281 of the linkage 28 so as to hold the flaps 26 in the closed position via hinged arms 282 connected to the opposite end of the shaft 281. In the closing position of the air admission means as shown in FIG. 3, the actuators 27 exert traction on the shaft 281 in order to cause it to retract downstream and lower the flaps 26.

Figure 3:
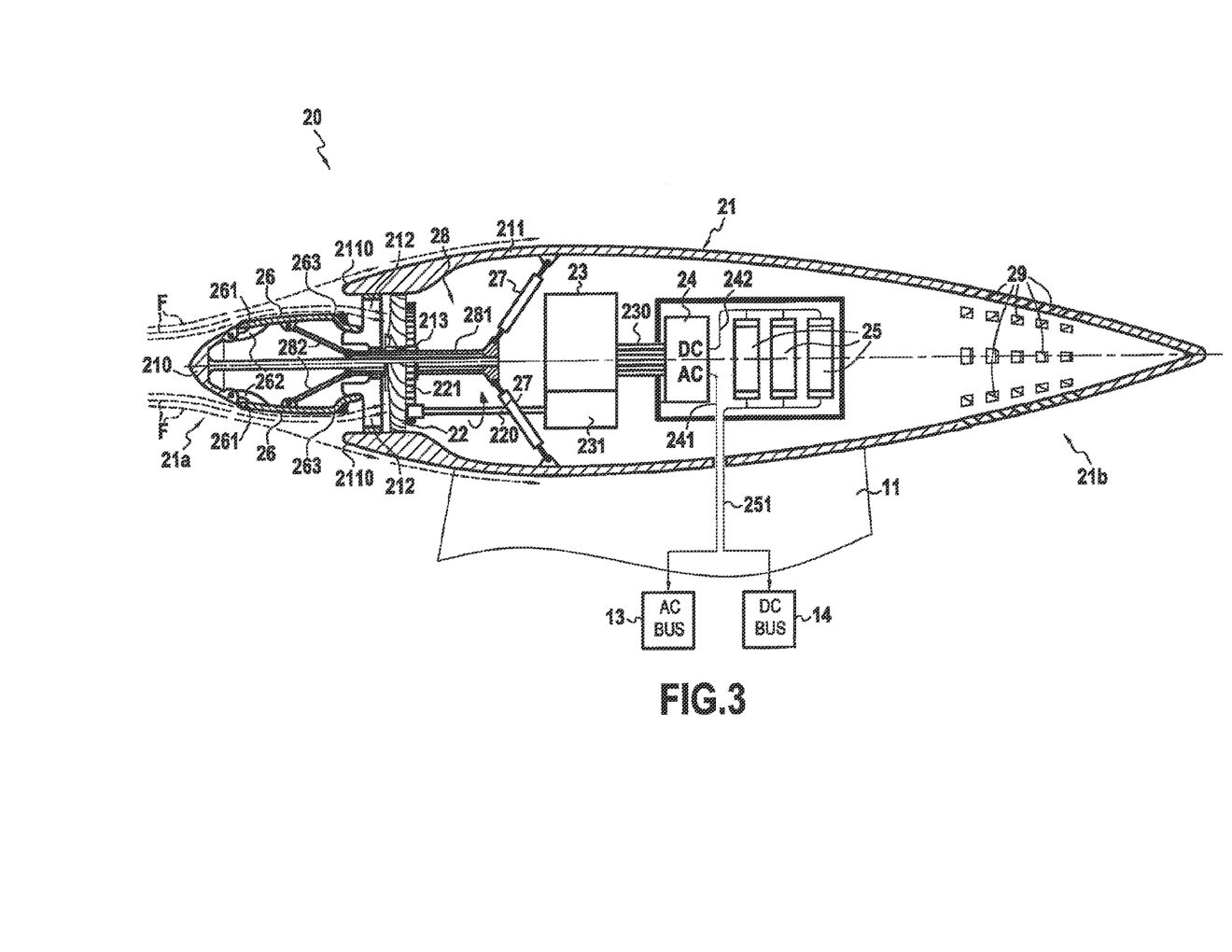
FIG. 3 is a diagrammatic section view of a FIG. 1 electrical energy generator system in an open position in accordance with an embodiment of the invention.

In the embodiment shown in FIGS. 2 and 3, the shaft 281 of the linkage 28 passes through the center of the turbine 22. The shaft 281 is supported by an internal portion 212 of the fairing that is of axisymmetric shape for the purpose of directing the outside air stream penetrating into the fairing 21 towards the blades of the turbine 22. The internal fairing portion 212 also supports a ball bearing 213 for the turbine 22. On its rear portion, the turbine 22 includes a gearwheel 221 that is engaged with the shaft 220 of the turbine 22 and that is offset relative to its axis.

By acting on the actuators 27, it is possible to cause the flaps to open and close, and consequently to generate or not generate electrical energy by means of the system 20. Thus, when the air admission means are put into the open position, as shown in FIG. 3, the flaps 26 are lowered into the inside of the fairing 21, thereby enabling the outside air stream F flowing over the fairing 21 to enter into the inside of the fairing and drive the turbine 22 in rotation, which by virtue of its coupling with the electricity generator 23, enables electrical energy to be produced. When there is no need to generate electrical energy by means of the system 20 and/or during stages of takeoff, climbing, or cruising, the flaps 26 are held in the closed position for the air admission means, as shown in FIG. 2, in order to reduce aerodynamic drag. In this position, the flaps are placed in alignment with the streamlined shape of the fairing 21, thereby totally masking the turbine 22 inside the fairing, together with all of the other elements used for generating and storing electrical energy. Consequently, in the closed position of the air admission means, the flaps 26 do not create longitudinal drag, with the system 20 then acting fully to reduce wing tip turbulence.

The rear portion 21*b* of the fairing 21 has openings that are formed in this example by louvers or vents 29 enabling the stream of air admitted into the inside of the fairing 21 to escape therefrom when the air admission means are open. This avoids raising pressure inside the fairing 21. In addition, the stream of air flowing in this way inside the fairing 21 serves to cool the power electronics associated with the electricity generator and also to cool the electrical energy storage means, in particular when they are constituted by batteries that may heat up during charging. The openings may be permanent or they may be closable on command.

In a variant embodiment of an electrical energy generator system 120 in accordance with the invention, as shown in FIGS. 4A, 4B, 5A, and 5B, the air admission means may be constituted by slats or butterfly members 126 extending between the nose 1210 and the body 1211 of the fairing 121. More precisely, the upstream and downstream ends 1261 and 1262 of each slat 126 are fastened respectively to the nose 1210 and to the body 1211 via pivot connections 1212 and 1213. In the presently-described example, each slat is connected to a pivot shaft 1281 by a link 1282. Pivoting of the shaft 1281, and consequently pivoting of the slat 126, is driven by an actuator 127 connected at one of its ends to the opposite free end of the shaft 1281 and at its other end to the inside wall of the fairing 121. The other portions of the electrical energy generator system 120 are identical to those of the above-described system 20 and are not described again, for simplification purposes.

Figure 5A:
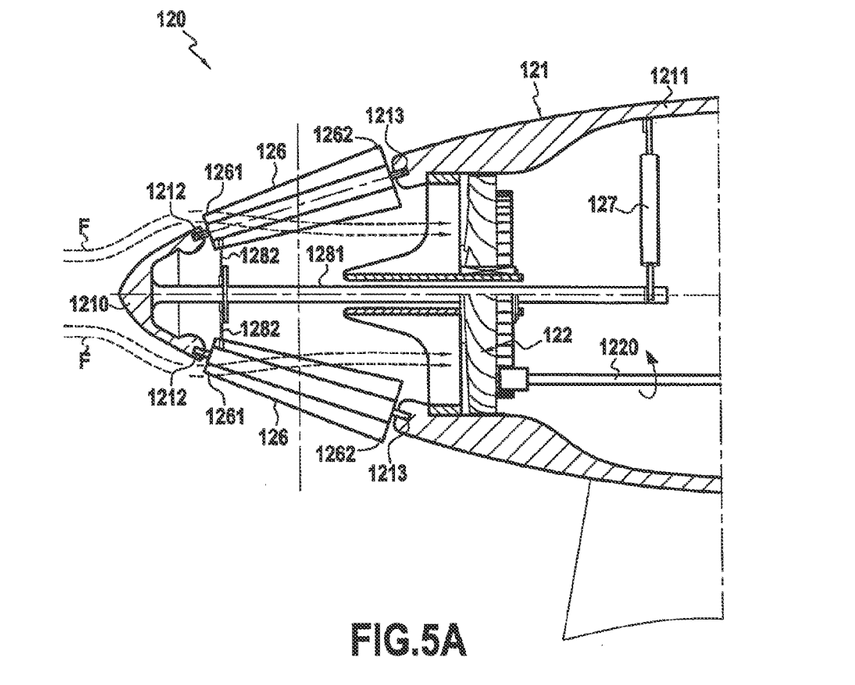
FIGS. 5A and 5B are diagrammatic section views showing an electrical energy generator system in an open position in accordance with another embodiment of the invention.
Figure 5B:
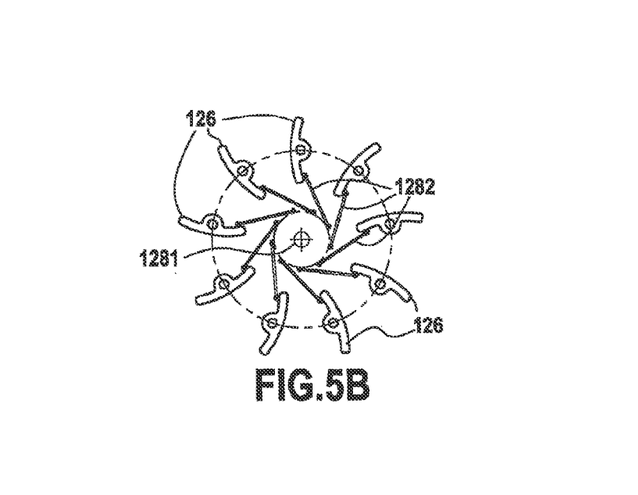

By acting on the actuator 127, it is possible to open and close the flaps, and consequently to generate or not generate electrical energy by means of the system 120. Thus, when the air admission means are put into the open position as shown in FIGS. 5A and 5B, the actuator 127 is actuated to pivot the shaft 1281, and consequently to pivot the shafts of the slats 126 so that they occupy the position shown in FIG. 5B. This position of the slats 126 enables the outside stream of air F flowing over the fairing 121 to enter into the inside of the fairing and drive the turbine 122 in rotation, which by means of its shaft 1220 coupled to an electricity generator (not shown in FIG. 5A), serves to produce electrical energy. In FIG. 5B, it can be seen that the slats 126 present good aerodynamic transparency (i.e. low drag) when they are in their open position.

Figure 4A:
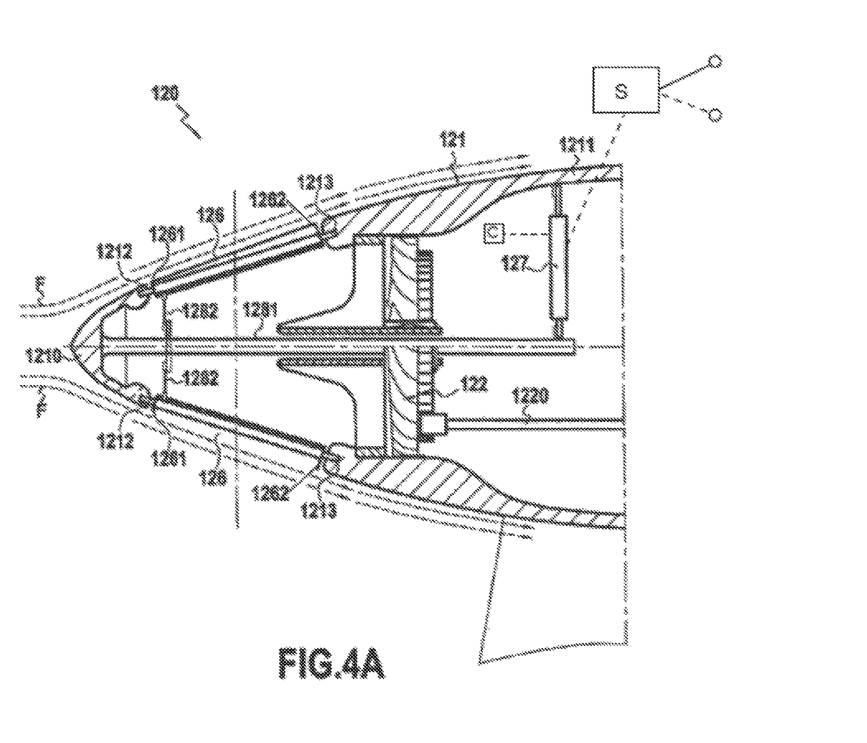
FIGS. 4A and 4B are diagrammatic section views showing an electrical energy generator system in a closed portion.
Figure 4B:
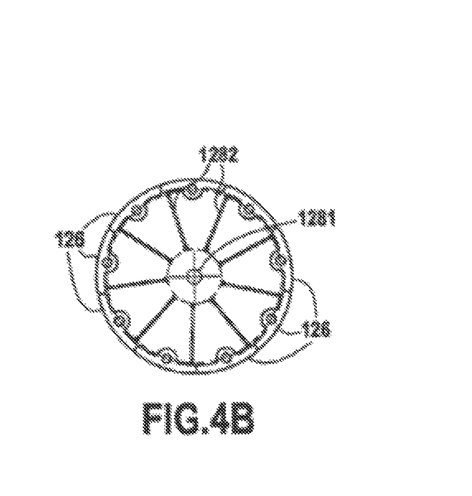

When there is no need for electrical energy to be generated by the system 120, and/or during stages of takeoff, climbing, or cruising, the slats 126 are held in the closed position of the air admission means, as shown in FIGS. 4A and 4B. In this position, the slats are placed in alignment with the streamlined shape of the fairing 121, thereby totally masking the turbine 122 inside the fairing, together with all of the other elements used for generating and storing electrical energy. Consequently, in the closed position of the air admission means, the slats 126 do not create longitudinal drag, with the system 120 then acting fully to reduce wing tip turbulence.

Figure 4C:
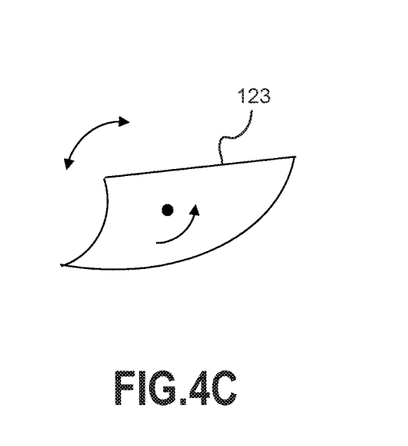
FIG. 4C is an end view of a blade of a turbine, in accordance with another embodiment of the invention.

In order to control the speed of rotation of the turbine in the electrical energy generator system of the invention as a function of the speed of the air stream entering the turbine, and as shown in FIG. 4C, the turbine may have variable pitch blades 123, with the pitch of the blades 123 being increased when the speed of the air stream is high, and reduced when the speed of the air stream is lower.

The electrical energy generator system(s) of the invention may be controlled automatically by the control system (onboard computer) of the airplane. The airplane control system may be programmed in particular to:

cause the air admission means to open automatically at least during a stage of the aircraft descending;

cause the air admission means to open automatically in the event of at least one engine of the aircraft failing; and     to cause the air admission means to open automatically in the event of a failure of a generator of at least one engine of the aircraft.

The electrical energy generator system(s) may also be controlled manually by means of a control button or switch "S" placed in the cockpit of the airplane. The pilot or the copilot can thus act manually to open the air admission means, and consequently to produce electrical energy, whenever they so desire, and in particular in the event of an emergency (total failure of one or more of the main engines or loss of electricity generator from one or more of said engines), or in an electric airplane emergency.

Thus, the electrical energy generator system of the invention advantageously replaces the emergency ram air turbines (RAT) that exist on present airplanes and that in addition to being heavy and expensive, sometimes present problems of reliability.

In addition to the above-mentioned advantages, the electrical energy generator system is placed at locations of the aircraft that are easily accessible, thereby greatly simplify maintenance, in particular maintenance of the power electronics and of the energy storage means, since they are immediately accessible, while being isolated from the inside space of the airplane that is occupied by passengers, thereby preventing possible harmful gases, e.g. generated in the event of thermal runaway of one or more batteries, reaching the cabin of the airplane.

The invention claimed is:

1. An electrical energy generator system for an aircraft, wherein the system comprises:
   a shell having the shape of a wing tip tank, wherein the shell comprises a front portion, a body, and a rear portion;
   at least one turbine housed in the front portion of the shell; and
   an electrical energy generator connected to the at least one turbine, wherein the electrical energy generator is configured to generate electrical energy,
   wherein the front portion of the shell includes flaps that are movable between an open position in which the at least one turbine is exposed to the air stream outside the shell, and a closed position in which the at least one turbine is masked inside the shell, and
   wherein the flaps are movably fastened between a nose of the shell and the body of the shell, wherein the flaps are hingedly fastened to the nose, the flaps being lowered inside and/or into the shell in the open position, and the flaps being held in alignment with the body of the shell in the closed position.

2. A system according to claim 1, characterized in that the system further comprises a storage means configured to store the electrical energy generated by the electrical energy generator.

3. A system according to claim 2, characterized in that the storage means includes at least one electrical energy storage means selected from at least one of the following: a battery; a supercapacitor; and a flywheel.

4. A system according to claim 1, characterized in that the system includes airflow openings in the rear portion of the shell.

5. A system according to claim 1, characterized in that the at least one turbine has variable pitch blades.

6. An aircraft including at least one electrical energy generator system according to claim 1.

7. An aircraft according to claim 6, characterized in that the aircraft includes a control device and actuators connected to the flaps via a linkage system to cause the flaps to open.

8. An aircraft according to claim 6, characterized in that the aircraft includes a control device and actuators connected to the flaps via a linkage system, enabling the flaps to be opened manually in the event of an urgent need for electrical energy.

9. An electrical energy generator system for an aircraft, wherein the system comprises:
   a shell having the shape of a wing tip tank, wherein the shell comprises a front portion, a body, and a rear portion;
   at least one turbine housed in a front portion of the shell; and
   an electrical energy generator connected to the at least one turbine, wherein the electrical energy generator is configured to generate electrical energy,
   wherein the front portion of the shell includes slats that are movable between an open position in which the at least one turbine is exposed to the air stream outside the shell, and a closed position in which the at least one turbine is masked inside the shell,
   wherein the slats are pivotally fastened between a nose of the front portion of the shell and the body, and wherein the slats extend perpendicularly relative to a surface of the shell in the open position and are held parallel with the surface of the shell in the closed position.

10. A system according to claim 9, characterized in that the at least one turbine has variable pitch blades.

11. A system according to claim 9, wherein the system further comprises a storage means configured to store the electrical energy generated by the electrical energy generator.

12. A system according to claim 11, wherein the storage means includes at least one electrical energy storage means selected from at least one of the following: a battery; a supercapacitor; and a flywheel.

13. A system according to claim 9, wherein the system includes airflow openings in the rear portion of the shell.

14. An aircraft including at least one electrical energy generator system according to claim 9.

15. An aircraft according to claim 14, wherein the electrical energy generator system includes a control device and actuators connected to a pivot shaft and links to cause the slats to open.

16. An aircraft according to claim 14, wherein the electrical energy generator system includes a control device and actuators connected to a pivot shaft and links enabling the slats to be opened manually in the event of an urgent need for electrical energy.

* * * * *